(12) United States Patent
Gunn

(10) Patent No.: US 6,402,897 B1
(45) Date of Patent: *Jun. 11, 2002

(54) APPARATUS FOR DISTILLING, HEATING AND STORING LIQUID

(76) Inventor: Charles L. Gunn, 1236 Monterey Cir., Lawrenceburg, IN (US) 47025-9213

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/957,637

(22) Filed: Oct. 24, 1997

(51) Int. Cl.⁷ .............................. B01D 1/28; B01D 3/42; C02F 1/04
(52) U.S. Cl. .......................... 203/1; 159/47.1; 159/901; 202/172; 202/173; 202/181; 202/182; 202/175; 202/265; 203/10; 203/24; 203/26; 203/71; 203/98; 203/DIG. 8
(58) Field of Search ................... 202/181, 182, 202/155, 236, 186, 205, 173, 176, 172, 202, 175, 265; 203/26, 24, 98, 71, 100, 10, 11, DIG. 8, DIG. 14; 165/13, 65; 159/DIG. 16, 901, 900, 24.1, 25.1, 25.2, DIG. 13, 46, 47.1, 28.4

(56) References Cited

U.S. PATENT DOCUMENTS

| | | | |
|---|---|---|---|
| 797,255 A | | 8/1905 | Beers |
| 2,217,266 A | | 10/1940 | Cookson |
| 2,487,884 A | * | 11/1949 | Lunt .............................. 203/24 |
| 2,589,406 A | * | 3/1952 | Lantham, Jr. ................. 203/24 |
| 2,696,465 A | * | 12/1954 | Kittredge ....................... 203/23 |
| 3,288,685 A | * | 11/1966 | Kemper et al. ................ 203/23 |
| 3,444,050 A | * | 5/1969 | Sandquist ..................... 202/177 |
| 3,718,544 A | * | 2/1973 | Sims ........................ 202/185.3 |
| 3,860,494 A | * | 1/1975 | Hickman ...................... 203/10 |
| 3,956,072 A | * | 5/1976 | Huse ............................. 203/26 |
| 4,252,616 A | * | 2/1981 | Glazer .......................... 203/22 |
| 4,549,936 A | | 10/1985 | Erickson |
| 4,556,456 A | * | 12/1985 | Ruckriegel et al. ......... 202/202 |
| 4,601,789 A | | 7/1986 | Bjorklund |
| 4,622,103 A | * | 11/1986 | Shirley-Elgood et al. ... 202/197 |
| 4,668,345 A | * | 5/1987 | Warren ......................... 203/25 |
| 4,769,113 A | | 9/1988 | Sears |
| 4,863,567 A | * | 9/1989 | Raley ........................... 203/26 |
| 4,906,337 A | | 3/1990 | Palmer |
| 4,946,558 A | | 8/1990 | Salmon |
| 5,108,548 A | * | 4/1992 | Reane et al. ................ 202/182 |
| 5,286,351 A | | 2/1994 | Salmon |
| 5,304,286 A | * | 4/1994 | Palmer ......................... 203/10 |
| 5,348,623 A | | 9/1994 | Salmon |
| 5,587,054 A | * | 12/1996 | Keith ........................... 203/24 |
| 5,968,321 A | * | 10/1999 | Sears ........................... 203/23 |

* cited by examiner

Primary Examiner—Virginia Manoharan
(74) Attorney, Agent, or Firm—Dinsmore & Shohl LLP

(57) ABSTRACT

A combination liquid distillation unit and heater, where the distilled liquid is heated to an elevated temperature to effect distillation, and then stored and maintained at an elevated temperature in a hot liquid tank. Thermal communication between the distillation unit portion and the storage tank allow heat from the distillation unit to be recovered in the hot distilled liquid in the tank to be transferred back to the feed water and/or to help maintain the hot distilled liquid in the tank at an appropriate elevated temperature. A start-up chamber in the distillation unit stores a reservoir of feed liquid during periods of inactivity, and allows the hot distilled liquid in the tank to preheat this feed liquid so that the feed liquid boils more quickly upon start-up.

22 Claims, 8 Drawing Sheets

APPARATUS FOR DISTILLING, HEATING AND STORING LIQUID

TECHNICAL FIELD

The present invention relates to an apparatus and method for the distillation, heating and storage of liquids, and more specifically to residential vapor compression distillation of water residential hot water storage. Particularly, vapor distillation is performed at least partially integrally with a storage tank which stores the hot, distilled liquid after distillation, so the distillation energy can be recovered by the stored liquid. The invention also includes an arrangement and process for automatically starting up the distillation unit with fresh feed water to enable quicker response to intermittent demands for distilled water.

BACKGROUND ART

Water supplied by municipalities to buildings and residences generally contains chemical impurities. These chemicals in the water can affect water odor and taste, and the water may even contain harmful quantities of mineral and biological materials. Due in large part to these potential problems with drinking water, people often install various devices to treat a portion of the water piped into their residence to remove some of the impurities. The treated water is then used for drinking and cooking.

Common methods of drinking water treatment include ion-exchange, reverse osmosis, filtration, absorption by absorbing mediums, and distillation. Each method has some drawbacks with respect to residential water treatment, however. For example, ion exchange (water softeners) generally replace calcium and magnesium ions with sodium. While this eliminates water hardness, the high sodium levels can leave undesirable deposits. Reverse osmosis is a relatively slow process which requires frequent back flushing and membrane replacement. Likewise, filtration and absorption are relatively slow, may require back flushing, and also require periodic replacement of components.

Distillation is used in some residences because it provides very pure water for drinking. Generally, in the distillation process, impure feed water is boiled to yield a distillate of pure water steam. The steam is then condensed to provide pure distilled liquid water. However, water distillation units generally operate at low distillation rates and the energy cost is relatively high. For this reason, residential distillation systems will often distill only a small supply of cold water for drinking and cooking. The relatively large supply of hot water needed for residential cleaning and bathing is generally not distilled, thereby minimizing the amount of distillation and reducing distillation costs.

According to this paradigm, wherein cold, drinking water is distilled and hot water is not distilled, there have been proposed apparatus which distill a relatively small supply of drinking water, while utilizing some of the heat given off during the distillation process to heat hot, undistilled water (e.g., for cleaning, bathing, etc.). For example, a combination apparatus for distillation of drinking water and storage of hot, undistilled water is disclosed in U.S. Pat. No. 5,348,623. A hot water heater is heated by the condensation of water being distilled and collected in separate tank. The amount of water distilled is small relative to the amount of hot, undistilled water which is stored in a hot water reservoir.

In the apparatus disclosed in U.S. Pat. No. 5,348,623, the undistilled, hot water which is stored in the hot water reservoir is heated by the heat released from the distilled water as it condenses from steam back into liquid. Since the heat of vaporization is very large relative to heat required raise the temperature of liquid water, only small amounts of distilled water can be economically generated before overheating the water in the storage tank. Of course, this may be acceptable in view of the fact that U.S. Pat. No. 5,348,623 appears to contemplate that its distilled water will only be distributed to locations where a small supply of distilled drinking water is needed, such as faucets adjacent to sinks and to ice machine. There remain problems of further maximizing the amount of distilled water while minimizing inconvenience and costs, especially energy costs.

DISCLOSURE OF THE INVENTION

It is an object of the present invention to provide an apparatus and process which obviates the above-described problems and shortcomings.

Another object of this invention is to provide an apparatus which distills liquid and supplies hot, distilled liquid on demand.

Another object of this invention is to provide a combination distillation unit and water heater which utilizes the technique of vapor compression distillation.

Another object of this invention is to provide a vapor compression distillation unit which has a start-up chamber which can be filled with feed water during inactive periods to facilitate quicker start-up.

It is a feature of the present invention that energy normally lost during distillation is transferred directly to the hot, distilled liquid storage tank and its distilled liquid contents. A potential advantage of this invention is that hot distilled water is produced and stored with only a small increase in energy costs over that required to operate a water heater which merely provides hot untreated water. Energy normally lost during distillation is directly transferred to pure, distilled, hot water stored in a tank.

According to the present invention, an apparatus for distilling and storing liquid includes a distillation unit for distilling liquid and a tank for storing the distilled liquid in a heated condition. The distillation unit receives feed liquid (e.g., water) and distills the feed liquid to yield distilled liquid and concentrate, wherein the distillation unit releases heat during distillation. The tank is constructed and located to be in thermal communication with the distillation unit, whereby the distilled liquid stored in the tank receives the heat lost by the distillation unit during distillation. The thermal communication between the distillation unit and the tank can be accomplished, for instance, by placing the distillation unit inside of the tank.

According to a further aspect of the present invention, the distillation unit distills liquid by vapor compression distillation. This vapor compression distillation requires less net energy than other distillation methods because most of the heat of condensation is recovered. Also, the heat given off by a vapor compression distillation unit will often be roughly commensurate with the heat which can be usefully applied to maintain water in a residential water heater at an appropriate elevated temperature and to heat untreated feed water as it is coming into the distillation unit.

According to some embodiments of the present invention, the vapor compression unit contains a start-up chamber and a boiler chamber. Storing untreated feed water in the start-up chamber during periods of inactivity can facilitate quicker start-up of the distillation unit. Specifically, with a start-up chamber, the untreated feed water needed to start up distillation is maintained in close physical proximity to and in thermal communication with the boiler chamber, and it will be somewhat preheated by heat transferred from the hot distilled water storage tank. The start-up chamber can be utilized to obtain a low distillation pressure in the boiler of the distillation unit. Also, the use of a start-up chamber allows distillation to commence on fresh, new feed water, rather than old concentrate.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE PREFERRED EMBODIMENTS

Figure 1:
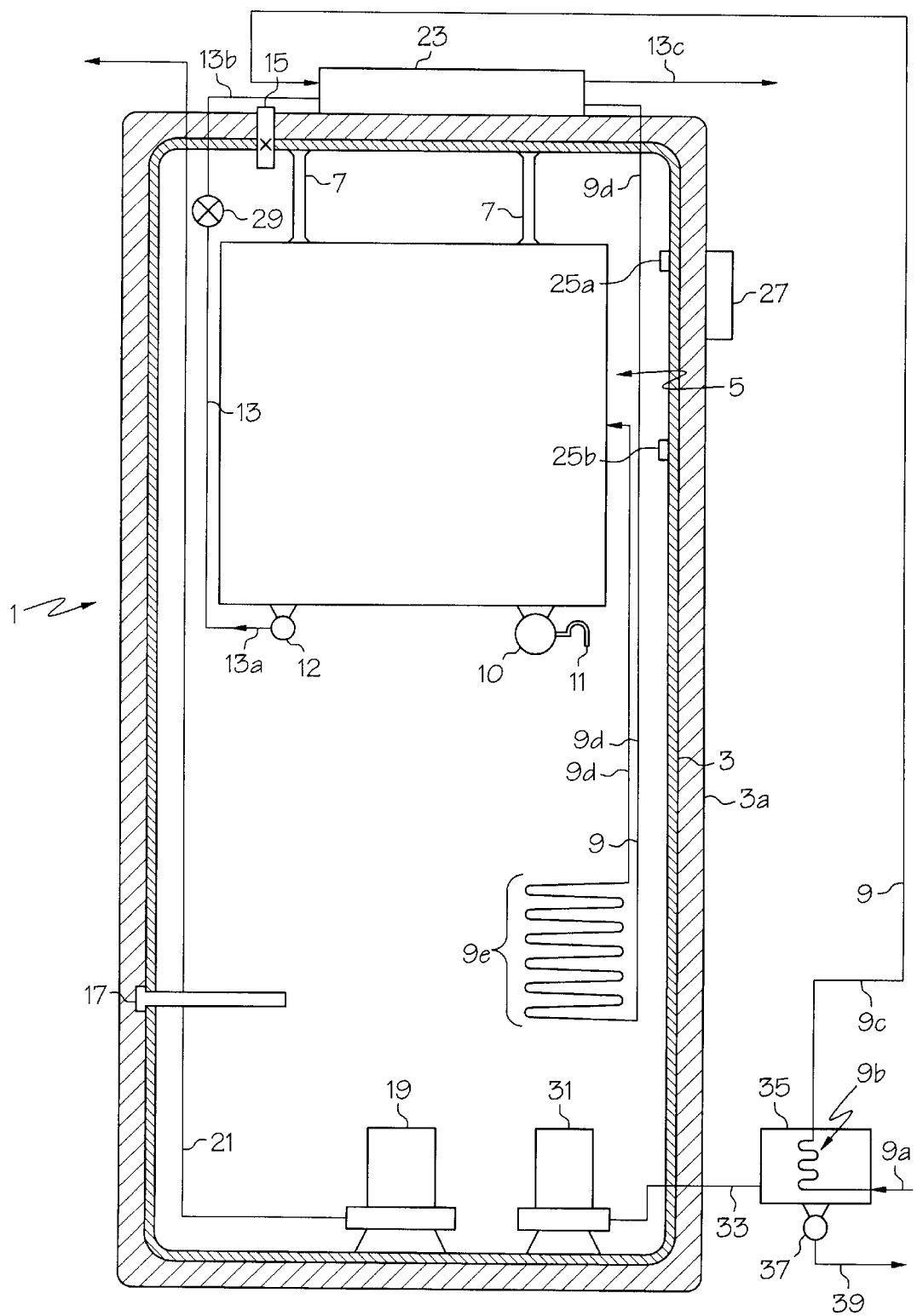
FIG. 1 is a schematic illustration of a preferred embodiment of a combined distillation unit and distilled water heater according to the present invention.

The present invention will now be described in detail with reference to the drawings, wherein like numerals indicate the same elements throughout the views, and wherein elements having the same final two digits (i.e., 118, 218, 318) indicate comparable elements of various preferred embodiments.
Distillation Unit in Tank Embodiment FIG. 1 is a schematic representation of a preferred embodiment of a combined distillation unit and distilled water heater apparatus 1 for distilling and providing hot and cold distilled water and for maintaining hot distilled water at an appropriate elevated temperature. In other words, apparatus 1 performs both the functions of a distillation unit and a water heater. Apparatus 1 includes a hot water tank 3 and a distillation unit 5, with the distillation unit 5 being supported inside of the tank 3 by support members 7.

Impure feed water (such as water piped into a residence) comes through feed pipe 9 and is fed into the distillation unit 5. The distillation unit 5 distills the feed water to yield distilled water and concentrate. More specifically, distillation unit 5 evaporates or boils the feed water to yield concentrate and distilled steam. The distilled steam is condensed in distillation unit 5 to yield distilled liquid water. The distilled water comes out of the distilled water exit 11 of the distillation unit 5 and directly into tank 3. The concentrate comes out of the distillation unit 5 and is carried out of the tank 3 by concentrate exit pipe 13.

The distilled water stored in the tank 3 is maintained at a temperature elevated above room temperature, which temperature is suitable for residential hot water needs (e.g., between about 120° F. and about 150° F.). The hot, distilled water stored in the tank 3 is removed and distributed though a hot water distribution pipe 21. Some of the hot, distilled water in the tank 3 is also redirected and cooled to provide cold distilled water through a cold water distribution pipe 39. The apparatus 1 thereby provides distilled water for any and all desirable uses.

Because the distillation unit 5 is located inside of the tank 3, in the embodiment of FIG. 1, it is in thermal communication with the tank 3 and its distilled water contents. Also, the inlet and outlet streams of distillation unit 5 may be located (at least partially) inside tank 3 so that there is thermal communication between the streams and the stored contents of tank 3. As used herein, "thermal communication" is defined as any physical arrangement of objects which promotes or otherwise facilitates the transfer of heat between the objects, whether by conduction or otherwise.

Because of the thermal communication between the distillation unit 5 and the tank 3, heat given off by the distillation unit 5 during distillation of water is transferred (i.e., recovered) to provide a substantial amount of the heat energy needed maintain the distilled water inside of the tank 3 in a heated condition at the appropriate elevated temperature. Also, because the distillation unit 5 is surrounded by hot distilled water and/or vapor, the distillation unit 5 loses little heat to the environment and therefore operates more efficiently.

Because the distilled water exit 11 directs the distilled water into the tank 3, there is a ready supply of hot distilled water. Hot distilled water is generally superior to untreated hot water for most household purposes. For example, distilled water reduces deposits in showers and tubs and more effectively cleans clothing skin and hair. In the present invention, instead of recovering the heat released by the distillation unit 5 to heat untreated water, the heat is used to maintain a supply of hot distilled water and to preheat feed water coming into the distillation unit 5.

This can work a powerful economy of energy resources because in many applications the heat released by the distillation unit, operating to supply an appropriate amount of distilled water for hot and cold water needs, will be roughly commensurate with the heat required to preheat incoming feed water and to maintain an appropriate amount of hot distilled water for residential hot water needs. Also, because the distillation unit 5 is in thermal communication with the hot distilled water rather than the (colder) atmosphere, the distillation unit 5 will tend to operate more efficiently and lose less heat, both during distillation and periods of inactivity (i.e., when no distillation is occurring).

Operations of apparatus 1 during periods of ongoing distillation will now be discussed in more detail in the context of exemplary operating temperatures and pressures. In the embodiment of FIG. 1, feed pipe 9 provides untreated feed water to the distillation unit 5. More specifically, section 9a carries the feed water to a cold distilled water cooler 35 (further discussed below). Coiled section 9b then carries the feed water through the interior of the cold distilled water cooler 35. Section 9c then carries the feed water to heat exchanger 23 (further discussed below). Finally section 9d, including coiled section 9e, carries the feed water into the distillation unit 5.

Section 9d is designed to allow high degree of thermal communication between the feed water in section 9d of the feed pipe and the hot distilled water stored in the tank 3. For example, in order to provide a high degree of thermal communication, section 9d may be designed to a large surface area and/or constructed from a thermally conductive material. Coiled section 9e, which makes up a part of feed pipe section 9d, further promotes thermal conduction of heat from the hot, stored distilled water to the feed water. As further explained below, the hot distilled water in the tank 3 is maintained at elevated temperature (e.g., about 120° to about 150° F.) by heat losses from the distillation unit, heat of the distilled water discharged into the tank 3 and heating element 17. Therefore, as the untreated feed water passes through section 9d of the feed pipe 9, it is significantly heated (e.g., to over 100° F.).

As a result of this structural arrangement and process, the feed water reaches an elevated temperature before it is even provided to the distillation unit 5, which helps effect boiling the feed water after it reaches the distillation unit 5. As will be understood, through this preheating of the feed water some of the heat given off by the distillation unit 5 and its resulting discharged distillate can be recovered in the feed water (via the hot distilled water reservoir in tank 3). Also, because feed water is generally being fed into the tank 3 while distillation is ongoing, the cooler feed water will not cause as much temperature fluctuation in the tank 3 because this cooling will be at least somewhat tempered or offset by heat recovered from the distillation unit 5 and its discharged distillate during the ongoing distillation.

As will become apparent from the illustrations, distillation unit 5 receives the preheated feed water from feed pipe 9, and thereafter distills the feed water to yield distilled liquid water and liquid concentrate containing impurities. The distillation temperature is preferably about 155° F. or so, such that the distilled water and concentrate discharged from distillation unit 5 via the distilled water exit 11 will also be at approximately 155° F. As this newly discharged water mixes with the stored hot water (e.g., at 120° F. to 150° F.), this reservoir of hot, distilled water will be heated accordingly. This heat is then recovered by heating of section 9d of the feed pipe during ongoing distillation and also by offsetting thermal losses of the tank 3 to the environment to some extent. In this way, a substantial portion of the heat transferred to the feed water in order to raise its temperature to the distillation temperature of 155° F., is recovered after distillation. Several alternative embodiments of the distillation unit 5 will be discussed in more detail herein.

The distilled water is pumped out of the distillation unit 5 by exit pump 10 through the distilled water exit 11 and directly into the interior of the tank 3, thereby replenishing the hot distilled water reservoir stored in the tank 3. A two-way valve 15 built into the tank 3 vents the interior of the tank 3 to the atmosphere to maintain a constant atmospheric pressure despite fluctuations in the level of hot distilled water stored in the tank 3.

In normal household type applications, the hot distilled water will preferably be stored in the tank 3 at a temperature of approximately 120° F. to 150° F., which is appropriate for residential hot water uses, such as cleaning and bathing. Thermal insulation 3a helps to maintain the hot distilled water in tank 3 in a heated state. The hot distilled water in tank 3 will lose some heat through the walls of the tank 3 and also through heat transfer to the feed pipe section 9d which carries the feed water. In order to maintain the hot distilled water at an appropriate temperature range, a heating element 17 (which might preferably be controlled by an integral thermostat) detects the temperature of the water in the tank 3 and heats the water when necessary.

Heating element 17 will generally need to provide much less heat, however, than the heating element of a conventional water heater, because the distillation unit 5 and its discharged distillate will provide heat for preheating feed water to an appropriate hot water temperature, and much of the heat needed to maintain an appropriate temperature despite thermal losses through the tank walls. It is also noted that while heating element 17 and other heating elements described herein are preferably electric heaters, other kinds of heaters, such as gas, oil, solar or heat pump heaters can be used.

Submersible pump 19 pumps hot distilled water out of the tank 3 on demand via hot distilled water distribution pipe 21. One example of a suitable kind of submersible pump is a submersible sump pump manufactured by the Lobee Pump & Machinery Company of Gasport, N.Y. For example, a reduction in system pressure will activate the submersible pump 19 to pump hot distilled water out of the tank 3. The hot distilled water distribution pipe 21 carries the hot distilled water to locations, such as showers and washing machines, where hot water is needed.

Submersible pump 21 pumps hot distilled water through cooler feed pipe 33 to cold distilled water cooler 35. The distilled water stored in cooler 35 is allowed to cool to an appropriate cold water temperature range for a predetermined application. For some applications, cooling or refrigeration equipment (not shown) may be used to cool the distilled water more quickly, or to a temperature below the temperature of the environment. When cold water is required, pump 37 pumps the cold distilled water out through cold distilled water distribution pipe. In this way, pure, distilled water is supplied for both hot and cold water needs.

As stated above, coiled section 9b of feed pipe 9 runs through the interior of the cooler 35. This structure allows heat transfer from the distilled water in the cooler 35 to incoming feed water in feed pipe 9b, whereby some of the heat of the cooling distilled water may be recovered by preheating the feed water.

Concentrate removed from the feed water through distillation is intermittently pumped out of the distillation unit 5 by concentrate pump 12 via concentrate exit pipe 13. One suitable kind of concentrate pump is a gear pump, such as a bronze gear pump. Concentrate check valve 29 controls the flow of concentrate out of the distillation unit 5 and can prevent concentrate backflow when the concentrate pump 12 is not operating. The concentrate leaving the distillation unit will be approximately at the distillation temperature of 155° F. However, due to the structural arrangement of the present invention, this heat is usefully recovered to a large extent in tank 3 and in concentrate heat exchanger 23. As shown in FIG. 1, section 13a of the concentrate exit pipe 13 also runs from the distillation unit 5 and then through the interior space in the tank 3. As concentrate passes through section 13a, heat will be transferred from the concentrate to the hot distilled water (at 120° F. to 150° F.) stored in the tank. This heat from the concentrate helps to heat the feed water in section 9d and also to offset thermal losses of the tank 3 to the environment.

Section 13b of the concentrate exit pipe 13 carries the concentrate to concentrate heat exchanger 23. When the concentrate reaches the heat exchanger 23, it will still be somewhat hot (e.g., 120° F. to 155° F.). In the heat exchanger 23, heat will be transferred to feed water in section 9c of the feed pipe 9. By heating the feed water in concentrate heat exchanger 23, less heat is required in the tank 3 and distillation unit 5 to bring the feed water to the distillation temperature of 155° F. After passing through the heat exchanger 23, the concentrate is carried by section 13c of the concentrate exit pipe 13 to an appropriate disposal system (not shown).

Of course, the level of hot, distilled water in the tank will fluctuate as water is distilled and as distilled water is removed for hot and cold water needs. An appropriate level in the tank 3 is maintained by tank level sensors 25a, 25b and operations controller 27. Based on the level of water in the tank 3, the lower tank level sensors 25b determines when more hot distilled water should be produced. Upper tank level sensor 25a determines that the tank 3 has been refilled. The level sensors 25a, 25b send signals to the operations controller 27. In response to these signals, the operations controller 27 will control system operations, such as starting or stopping distillation. A more detailed description of the operations occurring at distillation start-up and shut-down will be given below with reference to FIGS. 1 and 2.

Apparatus 1 can be modified so that the distilled liquid is pumped out of the tank 3, and the concentrate is stored in tank 3 at an elevated temperature. The apparatus would be similar to the apparatus shown in FIG. 1, except that the concentrate would exit the distillation unit 5 through exit 11 and the distilled liquid would be exited through exit pipe 13. Such a modified apparatus may be useful in some applications where the distillation is being performed in order to obtain the concentrate as a final product.

Vapor Compression Distillation

In the combination distillation unit and distilled water apparatus 1, explained above in connection with FIG. 1, any conventional distillation unit can be used as the distillation unit 5, and the operations of distillation unit 5 were not discussed in great detail. In some preferred embodiments of the present invention, the distillation unit is a vapor compression distillation unit. The process of vapor compression distillation will now be discussed generally before discussing several vapor compression distillation unit embodiments appropriate for use in the present invention.

Vapor compression technology has been used commercially for many years as a means to generate low cost distilled water. In vapor compression distillation units, energy released by condensation of the distilled steam back into liquid water is transferred back to the incoming feed water which is being boiled. A blower or compressor maintains the steam at a higher temperature and pressure than the boiling liquid. The temperature difference between the boiling feed water and the distilled steam is utilized in directing the heat from condensation into the boiling water within a heat exchanger.

Theoretically, all of the energy expended to vaporize the distillate can be recovered in the distillation unit to heat and boil incoming feed water in the boiler. However, because of thermal losses, pressure drop and equipment inefficiency, additional energy is required beyond that theoretically needed. Converting water to steam at 212° F. requires 8000 BTU/gallon, which is available for recovery by the heat exchanger (except for about 15 BTU/gallon due to entropy changes).

Additional to the energies to boil the feed water, energy is required to heat the water to boiling (1200 BTU/gallon from 60° F. to 212° F.) and to maintain it in a heated condition until needed. As explained above in connection with apparatus 1, by using efficient heat exchangers on the exit distillate (tank 3 and section 9d) and concentrate streams (see concentrate heat exchanger 23), much of the heating-to-boiling energy can be recovered by preheating the feed water.

Some small commercial units (125 gal/hr.) using vapor compression reportedly produce water for about 420 BTU/gallon (which is about $0.01/gallon at current cost rates). This exceeds the blower/compressor power consumption theoretically required because of the tremendous effect of thermal loss from the equipment and practical limitations on heat transfer efficiencies. Larger units have reported better economics with reported energy consumption rates well below 400 BTU/gallon and even below 100 BTU/gallon. Table 1 shows how the amount of energy lost affects the energy required for vapor compression distillation.

TABLE 1

Calculated energy required to produce 1 gallon of distilled water by vapor compression distillation as a function of the amount of energy lost from the unit through conduction and heat exchange inefficiencies

| % of Distillation Energy Lost | BTU/gal |
| --- | --- |
| 0 | 85 |
| 1 | 177 |
| 2 | 269 |
| 3 | 361 |

At least for large scale units, vapor compression distillation techniques seem to be approaching the domain small energy losses shown in Table 1. While this is good news, it would not seem at first blush to have much bearing on the present invention, because this heat lost during distillation is recovered in the hot distilled water reservoir. However, high efficiency vapor compression distillation units are indeed especially appropriate for use in the present invention because the limited heat released by the distillation unit helps prevent overheating of the stored distilled water.

As an example, assume that the apparatus of FIG. 1 employs a 99% efficiency vapor compression distillation unit as distillation unit 5. The 99% efficiency distillation unit loses 1% of its distillation energy or about 177 BTU/gallon. Further assume that a gallon of feed water is to be added to the distillation unit and preheated from 60° F. to 120° F. in section 9d of the feed pipe, thereby removing about 480 BTU from the hot distilled water reservoir. However, when this water is distilled in the 99% efficiency vapor compression unit, the 177 BTU lost from the distillation unit is recovered in the reservoir. Furthermore, after the gallon (minus small losses to the concentrate stream) has been distilled, assume it is released into the reservoir at 155° F. where it cools to 120° F., thereby adding another 290 BTU to the reservoir.

The implication of this example is that when distilling a gallon of water, 480 BTU is removed from the reservoir and 467 (=177+290) BTU are added to the reservoir. This means that the unit operates at something close to a thermal equilibrium and the hot distilled water in the reservoir remains heated in the range of 120° F. to 150° F., but is not overheated by the heat given off by the distillation unit.

This kind of rough equilibrium becomes possible because of the fact that the hot distilled water itself is directed to and stored in the hot water reservoir, and because of the use of a high efficiency distillation unit, such as a vapor compression distillation unit. Of course, the foregoing example has been simplified by ignoring certain effects such as the concentrate heat exchanger 23 and thermal losses of the tank 3. Nevertheless, this simplified example suggests that the use of a vapor compression distillation unit in combination with a tank to store hot distilled water can work a powerful economy of energy resources.

Vapor Compression Distillation Unit with Spiral Heat Exchanger

Figure 2:
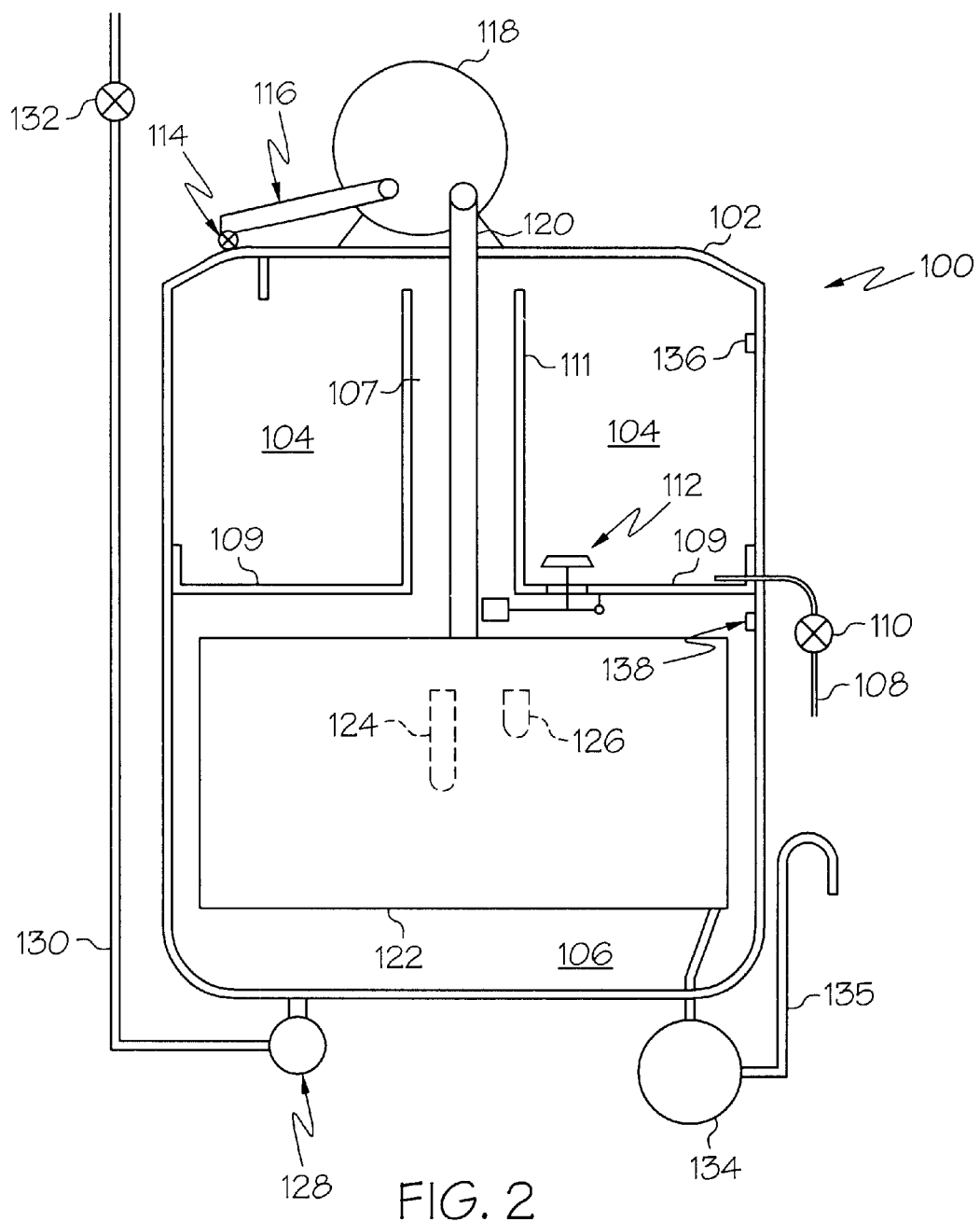
FIG. 2 is a schematic illustration of a preferred embodiment of a vapor compression distillation unit suitable for use in the present invention.

Referring now to FIG. 2, an embodiment of a vapor compression distillation unit 100 will be described. A vapor compression distillation unit 100 is enclosed by an outer wall 102. The outer wall 102 is thermally insulated by glass or plastic insulation in order to minimize heat transfer from the inside of the distillation unit 100 (at about 155° F.) to the hot distilled water reservoir (at about 120° F.) in which it is immersed. Inside of outer wall 102 are three chambers, start-up chamber 104, boiler 106 and vapor channel 107. The start-up chamber 104 is separated from the boiler chamber 106 by start-up chamber floor 109. The start-up chamber 104 is separated from vapor channel 107 by start-up chamber wall 111.

Operations occurring during ongoing distillation will now be described. Feed water is fed into the distillation unit 100 by feed pipe 108. Feed valve 110 in the feed pipe 108 opens to allow entry of feed water into the start-up chamber 104. A one-way valve 112 (further discussed below) allows feed water to pass through start-up chamber floor 109. Feed water enters the start-up chamber 104 and falls down through the one-way valve 112 into boiler chamber 106.

In the boiler chamber 106 the feed water is boiled. The boiler chamber 106 and start-up chamber 104 are maintained at a low pressure of about 4 psi so that the feed water will boil at a relatively low temperature of about 155° F. It is noted that 155° F. is a preferred temperature for the vapor compression distillation, because this temperature is high enough to prevent bacteria growth, and yet is low enough to be close to the water in the hot distilled water in which the distillation unit 100 is immersed. Also, the relatively low operating temperature (155° F.) distillation is less demanding on the pumps and compressor elements of the distillation unit 100, poses less risk of overheating the hot distilled water in which the distillation unit 100 is immersed, and requires less time to heat the feed water to boiling at start-up. Of course, it is possible to operate at other temperatures and pressures, such as atmospheric pressure (with a resultant distillation temperature of 212° F.).

The distillate steam which boils off of the boiling feed water rises through vapor channel 107 and through the start-up chamber 104. Start-up chamber 104 provides a head space where droplets of liquid water entrained in the steam will tend to fall back out of the distilled steam. The distilled steam passes from start-up chamber 104 through one-way valve 114 and pipe 116 into blower/compressor 118.

Blower/compressor 118 then forces the distilled steam through pipe 120 and into spiral heat exchanger 122. One example of a suitable blower/compressor is a oiless regenerative blower manufactured by the Gast Manufacturing Corporation of Benton Harbor, Mich. As shown in FIG. 2, spiral heat exchanger 122 is located in the boiler chamber 106, so that it at least partially immersed in the boiling feed water.

As the distilled steam is driven through blower/compressor 118, its pressure and temperature increase. This high temperature and pressure distilled steam condenses primarily in the spiral heat exchanger 122. Because the distilled steam is pressurized by the blower/compressor 118, condensation will take place at a temperature somewhat above 155° F. Accordingly, because the distilled steam condenses in the spiral heat exchanger 122 at an elevated temperature, the heat released by condensation will be transferred to the 155° F. boiling feed water in boiler chamber 106, thereby providing the heat to evaporate the feed water.

Figure 3:
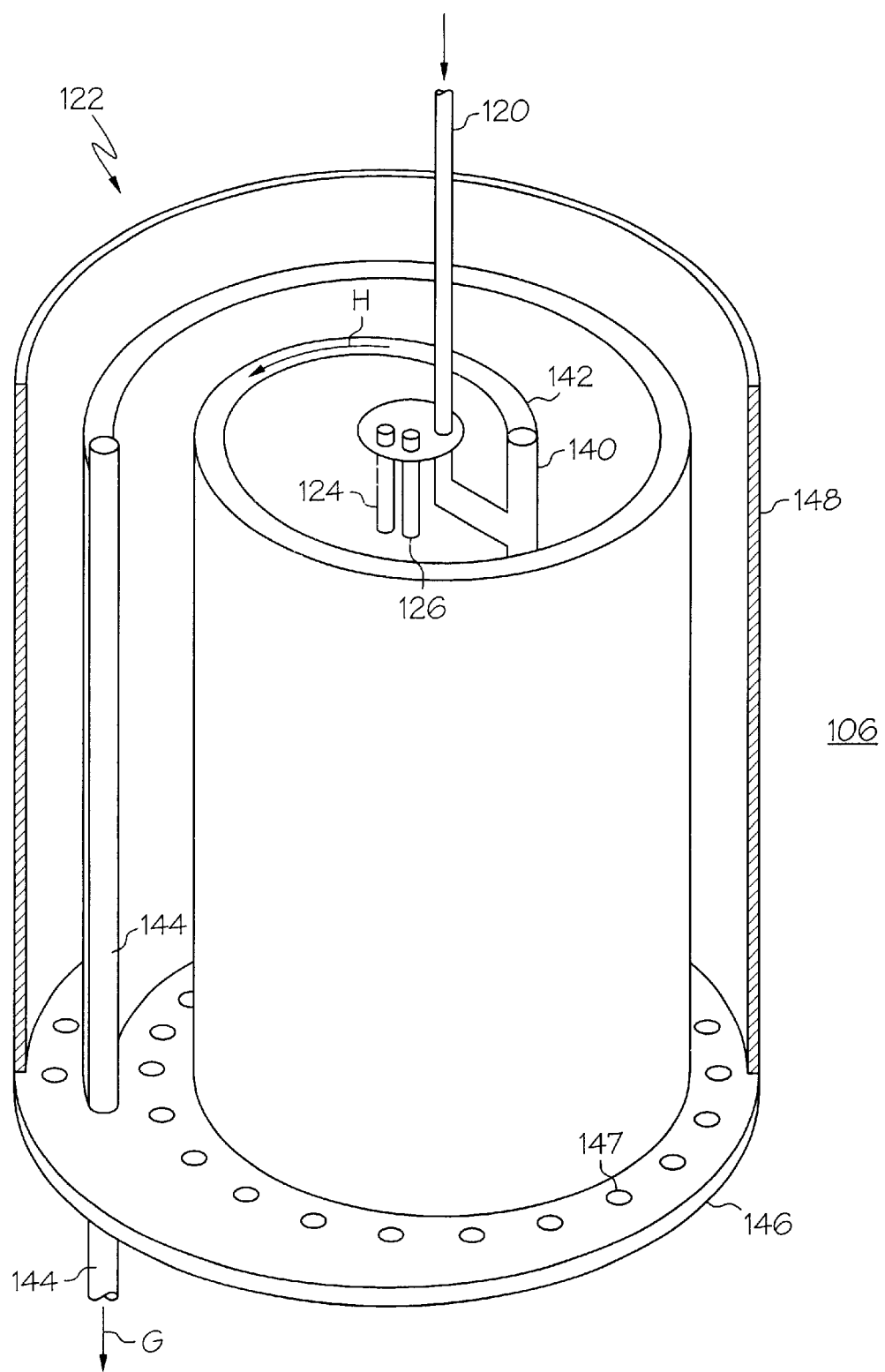
FIG. 3 is a partially cutaway view of the spiral heat exchanger of the distillation unit of FIG. 2.

Spiral heat exchanger 122 will now be discussed with reference to FIG. 3. The blower/compressor 118 drives distilled steam in the direction of arrow F down pipe 120. Pipe 120 feeds the distilled steam to the condenser header 140 in the spiral heat exchanger 122. The distilled steam passes from the condenser header 140 to a spiral chamber 142. Once inside the spiral chamber 142, the distilled steam travels around the spiral in the direction shown by arrow H. As the distilled stream travels within the spiral chamber 142, it condenses on interior walls of the spiral chamber 142.

At the other end of the spiral chamber 142 is exit tube 144. Condensed, distilled water, as well as some compressible and non-compressible distilled steam, exit through the exit tube 144 in the direction shown by arrow G to be pumped out of the distillation unit by pump 134. Because the spiral chamber 142 is generally immersed in boiling feed water in the boiler chamber 106 when distillation is taking place, heat released by the condensation will be transferred from the condensing distillate in the spiral chamber 142 to the feed water through the walls of the spiral chamber 142. This heat causes the feed water to boil, so that new distillate evaporates out of the top of the spiral heat exchanger 122 and up through vapor channel 107 to blower/compressor 118.

Spiral heat exchanger 122 also includes a bottom plate 146 with perforations 147. As the boiler chamber 106 is filled with feed water, feed water will pass through the perforations 147 to immerse the spiral chamber 142 in feed water. Feed water also immerses high wattage electrical heater 124 and low wattage electrical heater 126 (further discussed below) which are disposed in the center of this spiral heat exchanger, as shown in FIG. 3. Spiral heat exchanger 122 is enclosed by a side wall 148 which is opened at its top end to allow the escape of evaporated steam distillate from the feed water.

The spiral geometry of the spiral chamber 142 provides for a great deal of surface area between the condensing steam and the feed water on the exterior of spiral chamber 142. In turn, this large surface area promotes heat transfer to the boiling feed water to effect efficient vapor compression distillation.

After the distilled steam condenses in the spiral heat exchanger 122, it is pumped by distillate pump 134 out through the distilled water exit 134 and into the hot distilled water storage tank. The distillate pump 134 is constructed to handle both liquid and vapor so that it can pump the distilled liquid water, some non-compressible steam and some volume of non-compressible gas out of the heat exchanger 122. If there were undesirable volatiles in the feed liquid, the distillate pump 134 would be vented through a vapor trap. In this case, a one-way valve would be installed between the distillate pump 134 and the trap to allow distilled water from the tank to back up into the spiral heat exchanger 122 at shut-down. One example of a suitable distillate pump is a liquid ring pump manufactured by the Lobee Pump & Machinery Company.

Disposed on the spiral heater exchanger 122 within boiler chamber 106 are a high wattage electrical heater 124 and a low wattage electrical heater 126. During the distillation process, the high wattage heater 124 is turned on when a high pressure differential between suction and pressure sides of the blower compressor 118 indicates a need for additional vapor flow from the boiler chamber 106. The low wattage electrical heater 126 will continuously provide heat to the boiler 106, in order to bring the temperature of incoming (generally somewhat pre-heated) feed water up to the boiling point.

As explained above, the distillation is run so that the pressure in the boiler is relatively low and boiling consequently takes place at a relatively low temperature. The distilled steam is then compressed to a higher pressure so that its temperature will rise and heat will transfer from the distilled condensing steam in the spiral heat exchanger 122 to the boiling water in the boiler 106. This means that, to a large extent, the heat of vaporization required to boil water in the boiler 106 can be provided by heat being released during condensation in spiral heat exchanger 122. Theoretically, the heat of vaporization required to boil a given volume of water in the boiler 106 is equal to the energy released as it condenses in the spiral heat exchanger 122. This in turn minimizes the energy required by heaters 124, 126 to boil water in the boiler 106.

Now operation control for starting up and shutting down distillation will be described with reference to FIGS. 1 and 2. More specifically, in these exemplary operations of apparatus 1, the distillation unit 5 of apparatus 1 is constructed as distillation unit 100 of FIG. 2.

At first, the distillation unit 5, 100 is inactive. Because distillate pump 135 and blower/compressor 118 are turned off, distilled water has backed up from the tank 3, filling the spiral heat exchanger 122 and pipes 116, 120. However, one way valve 114 prevents distilled water from backing up into the start-up chamber 104. As further discussed below, boiler chamber 106 is filled with concentrate and start-up chamber 104 is filled with fresh feed water up to start-up chamber sensor 136. Feed valve 110 and concentrate check valve 29, 132 are closed and heating elements 124, 126 are turned off.

Although distillation is run at about 4 psi, the distillation unit 5, 100 loses a substantial portion of this vacuum during periods of inactivity. Also, although the distillation temperature is 155° F., thermal losses through the outer wall 102 of the distillation unit 5, 100 can cause the temperature inside the distillation unit to fall to the ambient hot water storage temperature (of 120° F. to 150° F.) during periods of inactivity. Still, it is noted that a temperature of 120° F. to 150° F. which is maintained in the distillation unit during inactive periods by the thermal communication between the distillation unit 100 and the tank 3 is an improvement over designs wherein a distillation unit is primarily in thermal communication with the atmosphere and can cool down to room temperature during inactive periods.

When the distillation unit 5, 100 is in this initial state, hot distilled water is pumped out of tank 3 to satisfy distilled water demands. When enough hot distilled water is removed from the tank 3, low level sensor 25b detects that the level of hot distilled water in tank 3 is low. In response to this, operations controller 27 controls distillation to start up, in order to replenish the water supply in tank 3.

Upon the start up of distillation, concentrate valve 29, 132 opens up as concentrate pump 12, 128 pumps concentrate out of boiler chamber 106 via concentrate exit pipe 13, 130. To the extent that the concentrate is above the temperature of the stored water in tank 3, heat will be transferred from the draining concentrate to the hot distilled water in tank 3. The concentrate passes through heat exchanger 23 and also heats up incoming feed water.

As the boiler chamber 106 empties, fresh feed water in the start-up chamber 104 falls through one-way valve 112 into the boiler chamber 106. Pressure will fall in the boiler chamber 106 and start-up chamber 104, forming a vacuum, as the concentrate is pumped out, thereby bringing the pressure toward the distillation pressure of about 4 psi. Because the start-up chamber 104 is separated from the boiler chamber 106, the liquid pumped out at this stage of start-up operations will primarily be old concentrate rather than fresh feed water. Starting the distillation with fresh feed water, having a lower concentration of impurities, results in a lower boiling point, less concentrate which must be removed per unit of distilled liquid, a greater temperature difference between the boiling feed water and condensing distillate and less scaling.

The concentrate pump 12, 128 will continue to pump out concentrate until shut off by a controller timer (not shown). The controller timer is set so that the liquid level in the boiler chamber reaches the distillation operational level. When the concentrate pump 12, 128 stops pumping concentrate, the one-way concentrate check valve 29, 132 closes in response to prevent backflow of concentrate.

The distillate pump 10, 134 is then turned on to pump distilled water out of the spiral heat exchanger 122 and pipes 116, 120. When the distillate pump 10, 134 starts up, the boiler/compressor 118 also starts up and the heating elements 124, 126 turn on. The heating elements 124, 126 heat the feed water in the boiler chamber to boiling and the blower/compressor 118 drives steam into the condenser 122 to start the distillation flow. During distillation, feed valve 110 controls the flow of feed water into the distillation unit 5, 100 to maintain the boiling water in the boiler chamber 106 at the distillation operation level.

Distillation proceeds until the tank 3 signals it is full based on liquid level detected by level sensor 25a, or until a timer monitoring the compressor indicates that the distillation unit has been operating for so long that the concentration of salts in the boiler may have reached a predetermined threshold level. Under either condition, the distillation unit 100 will shut down. It is noted that the level of (concentrate) liquid in the distillation unit 5, 100 will generally be at about the top of the boiler chamber 106, where it is maintained by the boiler sensor 138 during distillation.

In order to effect shut-down, the blower compressor 118 and the heating elements 124, 126 are turned off. Distillate pump 134 stops and distilled water will back up from tank 3 into the heat exchanger 122 and pipes 116, 120.

The feed valve 110 opens to fill the distillation unit 5, 100 up to the start-up chamber sensor 136. More specifically, fresh feed water will come into the start-up chamber 104 and pass through the one-way valve 112 down into the boiler chamber 106. Since the boiler chamber 106 is nearly full of concentrate at this time, it does not take long for the boiler chamber 106 to fill up and close the one-way valve 112. After one-way valve 112 closes (as further discussed below), then the incoming feed water fills up the start-up chamber 104 until start-up chamber sensor 136 indicates that the start-up chamber 104 is filled with fresh feed water.

The start-up chamber wall 111, floor 109 and the one-way valve 112 are constructed to minimize mixing of the fresh feed water in the start-up chamber 104 with the old concentrate in the boiler chamber 106. This way, when the distillation unit 5, 100 starts up again, the concentrate which is drained will be old concentrate with a high concentration of salts, and the feed water which falls into draining boiler chamber 106 will be fresh feed water.

Figure 4:
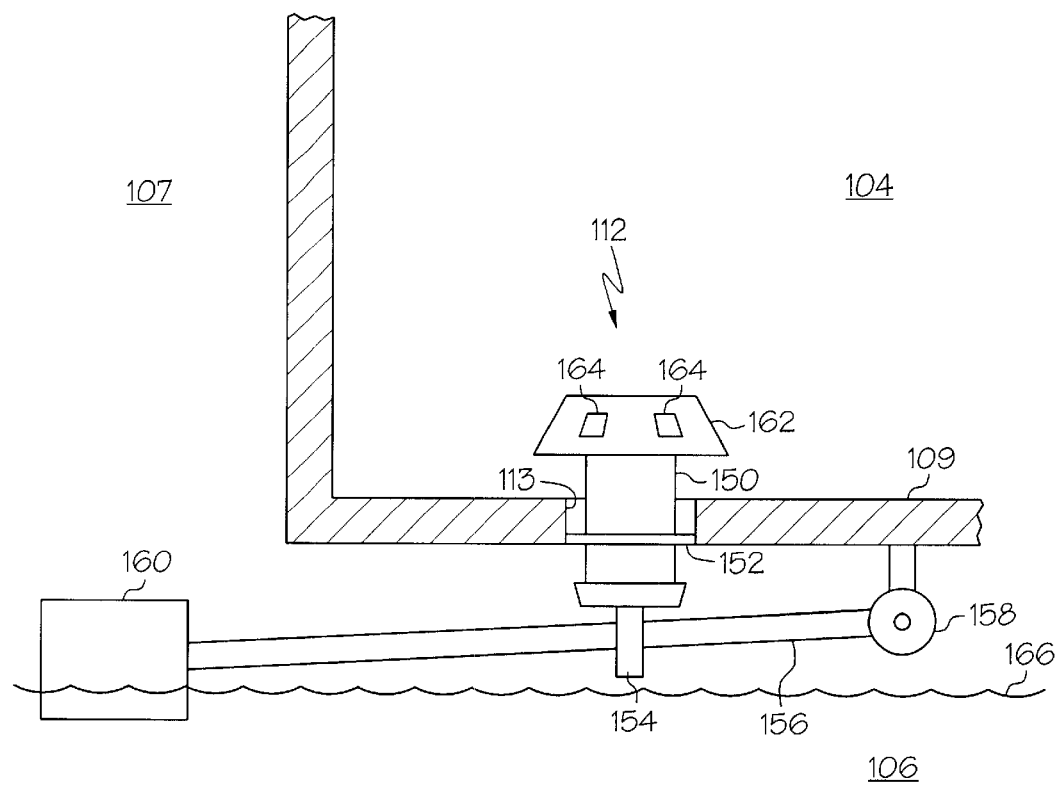
FIG. 4 is a detailed view of the one-way valve employed in the distillation unit of FIG. 2.

One-way valve 112, which controls the passage of feed water from start-up chamber 104 to the boiler chamber 106 will now be described with referenced to FIG. 4. One-way valve 112 includes valve plunger 150, ring gasket 152, slotted portion 154, pivot arm 156, swivel 158, float 160, and valve plunger head 162. Valve plunger 150 fits through valve plunger hole 113 in the startup chamber floor 109. Ring gasket 152 is disposed around the valve plunger 150. When the one-way valve 112 is in the closed position (as shown in FIG. 4), ring gasket 152 will close the valve plunger hole 113 and block the flow of feed water from start-up chamber 104, the boiler chamber 106.

At the bottom end of valve plunger 150 is a slotted portion 154. Pivot arm 156 fits into the slotted portion 154. Pivot arm 156 is connected between swivel 158 and float 160. Pivot arm 156 pivots about the swivel 158, in response to the position of float 160. Float 160 floats on top of the water 166 in the boiler chamber 106. When the level of the water 166 in the boiler chamber 106 is high, float 160 pushes pivot arm 156 upwards, thereby maintaining the valve plunger 150 and ring gasket 152 into a position of closing valve plunger hole 113.

When the level of the water 166 falls, float 160 descends with the water level. Pivot arm 156 pivots downwardly about swivel 158 with the float 160. This in turn allows the valve plunger 150 to descend, so that ring gasket 152 falls down out of valve plunger hole 113, thereby opening the hole 113 so that feed water may pass from the start-up chamber 104 to the boiler chamber 106. When the one-way valve 112 is in the closed position, valve plunger head 162 will fall down and rest on the start-up chamber floor 109. However, feed water passes through vents 164 which are defined in the valve plunger head 162, so that the feed water can get through valve plunger hole 113 and into the boiler chamber 106.

It can now be seen how one-way valve 112 permits feed water to flow into the boiler chamber 106 when the water level 166 in the boiler chamber is low, while blocking the flow of feed water when the water level 166 is high. More specifically, in the level of the water 166 in boiler chamber 106 descends, this in turn allows float 160, pivot arm 156 and ring gasket 152 to descend, thereby opening up valve plunger hole 113. Valve plunger hole 113 will remain in this open position until the water level 166 comes back up, forcing float 160 and pivot arm 156 to raise valve plunger 150 and ring gasket 152 into the closed position.

During an inactive period, when distillation is not occurring, a high level of old concentrate 166 is maintained in boiler chamber 106. This keeps float 160 at a high level and maintains the one-way valve 112 in the closed position. Because one-way valve 112 is closed, start-up chamber 104 can fill with water, and this water will be maintained in a heated state by the surrounding concentrate in boiler chamber 106 and hot distilled water in tank 3, so that the fresh feed water can be brought up to the boiling point more quickly upon startup. Of course, when the concentrate is exited from the boiler chamber 106, water. level 166 falls, thereby opening one-way valve 112 and allowing the fresh feed water to fall through valve plunger hole 113 into the boiler chamber 106.

Instead of one-way valve 112, small holes (e.g., 1/16" diameter holes) may be defined in the start-up chamber floor 109 and/or the start-up chamber wall 111. The holes would allow feed water to pass from the start-up chamber 104 to the boiler chamber 106 when the boiler chamber 106 when the water level in the boiler chamber 106 is low, while minimizing mixing between these chambers when the water level comes up to the location of the holes.

The use of a start-up chamber 104 also has benefits from a heat transfer standpoint. More specifically, the incoming feed water will be somewhat preheated as it travels through section 9d of feed pipe 9 on its way to the distillation unit 5, 100. However, because a reservoir of fresh feed water is stored in the start-up chamber 104 during inactive periods, the feed water will receive additional heat from the concentrate in boiler chamber 106. Also, because the distillation unit 5, 100 is in thermal communication with the contents of tank 3, it will lose less heat, and its temperature should fall no lower than the tank temperature (e.g., 120° F. to 150° F.), even during long periods of inactivity.

Because the reservoir of fresh feed water in the start-up chamber is maintained at such an elevated temperature, this means that less heat needs to be added to the feed water at start-up, and distillation will start more quickly.

The use of a start-up chamber especially facilitates quicker start-up in embodiments where the feed liquid is boiled at a reduced pressure (e.g., 4 psi). This is because, in order to achieve reduced pressure, concentrate is pumped out of the distillation unit 100 at start-up while the feed valve 110 remains shut. This means that no new feed water enters the distillation unit 100 while the boiler chamber 106 and start-up chamber 104 are being brought down to a low pressure at start-up. If there were no start-up chamber 104, the boiler chamber 106 would be substantially emptied of water during this depressurization. However, because there is stored water in the start-up chamber 104, the boiler chamber 106 can be depressurized and filled with feed water at the same time. This results in a quicker start-up.

The automatic starting and stopping operations, the thermal communication between the distillation unit and the hot water storage tank, and the use of a start-up chamber all allow quick response to intermittent hot water demands which typify residential applications.

The start-up chamber 104 and operational sequence described above also helps to achieve the vacuum (e.g., 4 psi pressure) in the boiler chamber 106 for vapor compression distillation. While the vacuum can be maintained if the distillation unit 100 is down for a short time, it is lost through leakage and rising non-volatiles from the feed water over longer inactive periods. By correctly sizing of the start-up chamber 104 relative to boiler chamber 106 volume and boiling level, boiling will be initiated at the desired pressure.

For example, assume that a 75% reduction in pressure is desired and the combined volume of the boiler chamber 106 and the start-up chamber 104 is 8 cubic feet. Further assume that the boiler chamber 104 is occupied by 4 cubic feet of liquid during normal distillation operation. In this case, the start-up chamber sensor 136 should be located so that it detects a liquid level 3 cubic feet above the distillation operating level, leaving 1 cubic foot of air and vapor space before the startup sequence begins. By having most of this 3 cubic feet of volume in the startup chamber, the feed water can be separated from the concentrate in the boiler until the concentrate (3 cubic feet of it) is pumped out to achieve the desired 75% reduction in pressure.

Alternatively, the start-up chamber could be remote from the boiler, but it is generally preferable to use its volume to separate liquid entrained in the boiling liquid. If boiler pressure is reduced more than planned because of residual vacuum, the compressor can not pump all the vapor generated and boiler pressure rises to that compatible with system capacity and temperatures. The vacuum can alternatively be obtained using a vacuum pump and deaerating techniques, but these are noisy and expensive to operate.

Vapor Compression Distillation Unit with Plate-In-Frame Heat Exchanger

Figure 5:
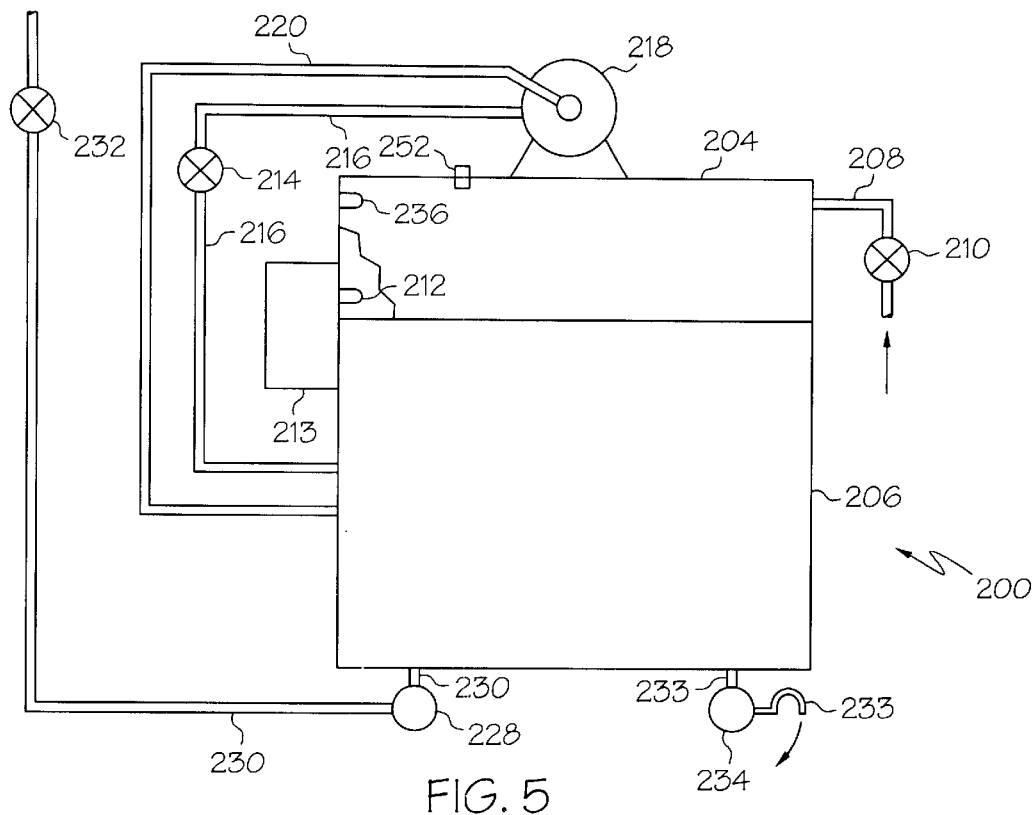
FIG. 5 is another preferred embodiment of a vapor compression distillation unit suitable for use in the present invention.

FIG. 5 shows a schematic view of another embodiment of a vapor compression distillation unit 200, which is suitable for use in the present invention. The primary difference between this vapor compression distillation unit 200, and the vapor compression distillation unit 100 explained above is that vapor compression distillation 200 employs a plate-in-frame heat exchanger 222, rather than spiral heat exchanger 122, to transfer heat from the condensing distillate to the boiling feed water.

Vapor compression distillation unit 200 includes start-up chamber 204 and heat exchange section 206. Feed water is fed into the start-up chamber 204 by a feed pipe 208. Feed valve 210 in the feed pipe 208 controls the flow of feed water into the start-up chamber 204. Feed water is then transferred from the start-up chamber 204 to the heat exchange section 206 through valve 212 located inside of header box 213. The header box 213 contains a level sensor to control the level of feed water in the heat exchange section 206. In the heat exchange section 206, distilled steam is evaporated off of the feed water. This distilled steam travels through pipe 216 and into blower/compressor 218. One-way valve 214 in the pipe 216 prevents the distilled steam from flowing back into the heat exchange section 206.

Blower/compressor 218 increases the pressure and temperature of the distilled steam and forces it through pipe 220. Pipe 220 leads back into the heat exchange section 206. In the heat exchange section 206, the high pressure and temperature distilled steam condenses into distilled liquid. The distilled liquid water is then pumped by distillate pump 234 out through distilled water exit pipe 233 and into the hot distilled water storage tank.

Concentrate left by the boiling feed water is periodically pumped by concentrate pump 228 to appropriate disposal through concentrate exit pipe 230. Concentrate check valve 232 prevents backflow of concentrate into the distillation unit 200. As in the vapor compression distillation unit 100, explained above, heat from the condensing distilled steam is transferred to the boiling feed water, to help facilitate vaporization of distilled steam. Specifically, blower/compressor 218 increases the pressure and temperature of the distilled steam, so that the distilled steam will condense in heat exchange section 206 at a relatively high temperature and so that heat transfer boiling feed water is consequently possible. However, vapor compression distillation unit 200 uses a plate-in-frame geometry heat exchanger 240 in its heat exchange section 206.

Figure 6:
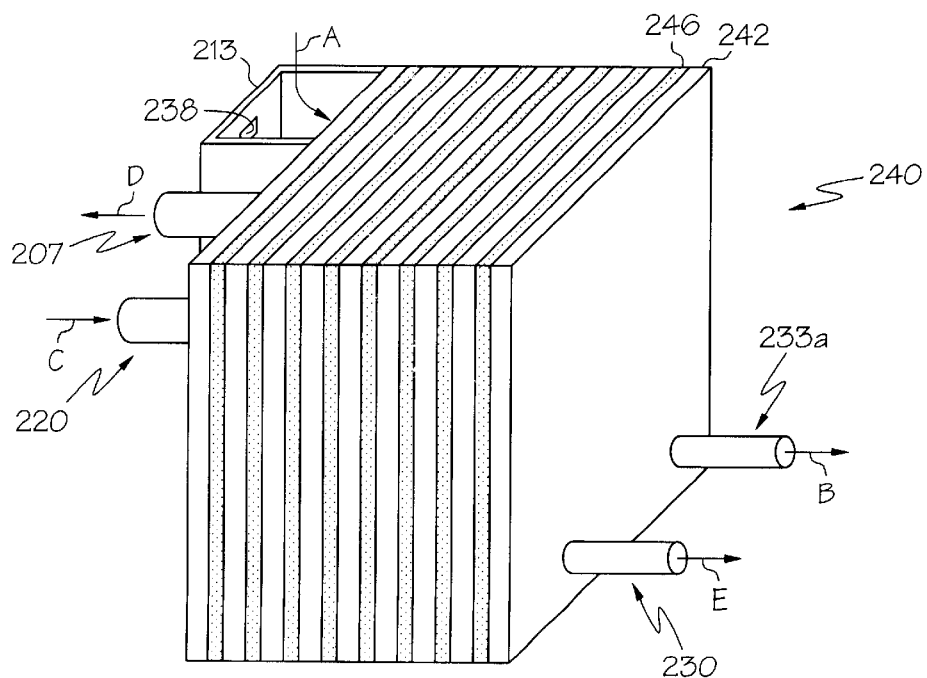
FIG. 6 is an exemplary heat exchanger which can be advantageously used in the embodiment of vapor compression distillation unit shown in FIG. 3.
Figure 7:
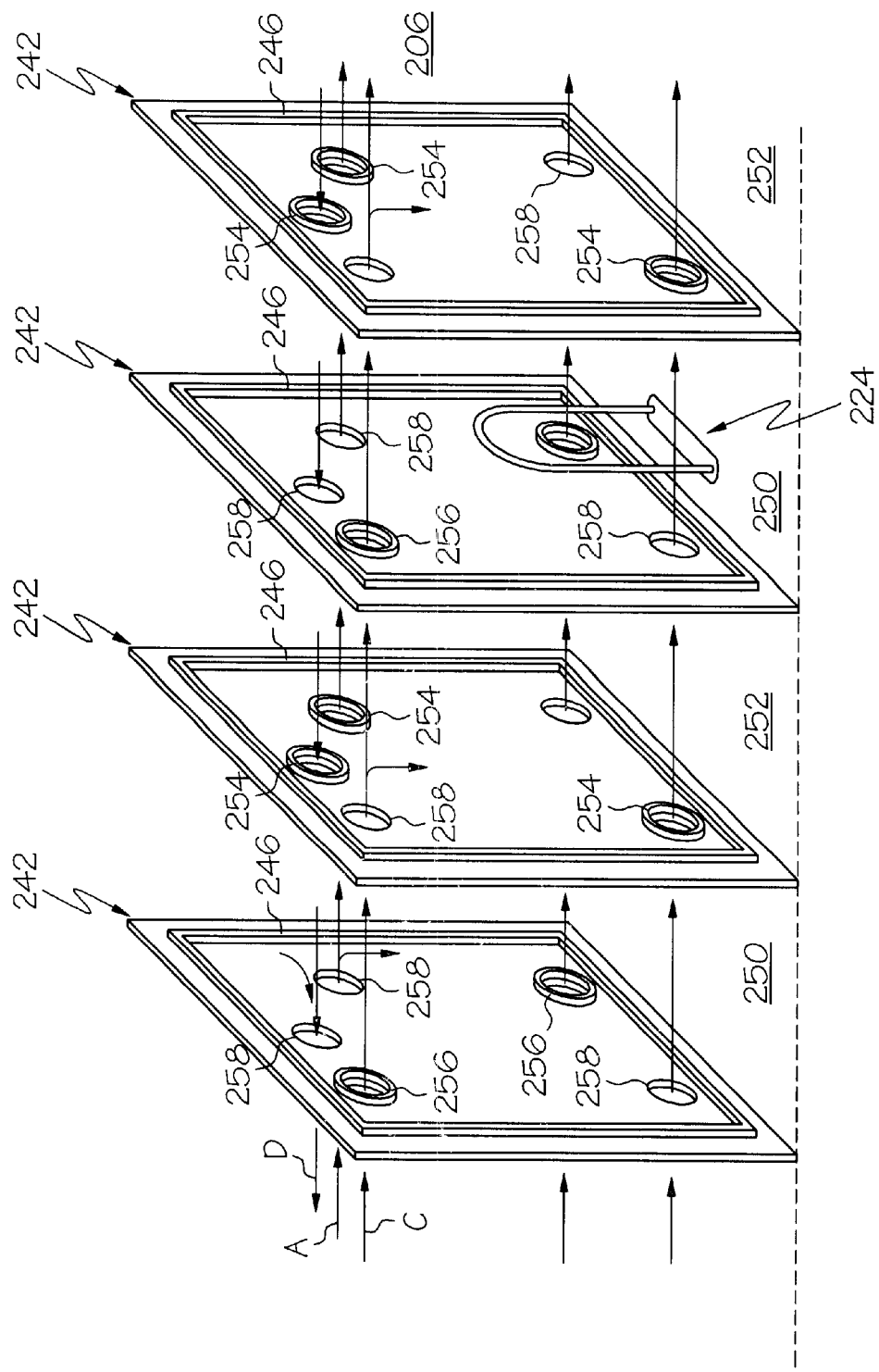
FIG. 7 is a sectional view of the heat exchanger of FIG. 4.

As shown in FIGS. 6 and 7, a plate-in-frame heat exchanger 240 is built by stacking thin sheets of metal 242 with gaskets 246 to form alternating boiler chambers 250 and condensing chambers 252. More specifically, the metal sheets 242 form two, upstanding, major walls for each chamber 250, 252, while the gaskets 246 form walls defining the sides of the chambers 250, 252, as well as fluid-tight ducts through the chambers 250, 252.

Gaskets 256 disposed within the boiler chambers 250 form ducts through the boiler chambers 250 for the passage of distilled, condensing steam through the boiler chambers 250. Similarly, gaskets 254 form ducts through the condensing chambers 252 for the passage of boiling feed water through the condensing chambers. In this way, the feed water is prevented from mixing with the distilled steam.

Heat from the condensing distilled steam in the condensing chambers flows 252 through the sheets 242 to heat and boil the feed water, in the alternating boiler chambers 250, on the other side. Entry and exit of feed water and distillate into each chambers are controlled by gaskets 254 and 256 around vapor and liquid channels 258. End plates receive piping from connecting systems.

The plate-in frame heat exchanger 240 is shown in FIG. 6. Feed water enters the plate-in frame heat exchanger 240 in the direction of arrow A, via valve 212 and header box 213. After feed water travels through the heat exchanger through gaskets 254, through a liquid channels 258 and into a boiler chamber 250, it is heated to boiling by the condensation of steam in the adjacent condensing chambers 252. Distilled steam from the boiling feed water escapes through liquid channels 258, gaskets 254, and then out of the heat exchanger 240 through pipe 207 to the blower/compressor 218 in the direction of arrow D.

The pressurized steam returns from the blower/compressor, in the direction of arrow C, through pipe 220. The pressurized steam-will pass through liquid channels 258 and gaskets 256 to a condensing chamber 252 to condense as described above. The distilled liquid condensate exits the condensing chamber 252 through further liquid channels 258 and gaskets 256 in direction of arrow B through section 233a of pipe 233. The concentrate is drained away from the boiling feed water in boiler chambers 250 in the direction of arrow E by pipe 230.

A level sensor 238 is placed in header box 213. The sensor tells the controller 27 when to open and close the feed valve 210 and thus maintains the head space for separation of vapor and the boiling liquid in the boiler chambers 250. An electric heater 224 is inserted into one of the central boiler chambers 250. The heater 224 initiates. boiling at startup and compensates for feed entering at below the boiling temperature.

The start-up chamber 204 works similarly to the start-up chamber in the spiral heat exchanger. The start-up and shut-down sequences are similar. Rather than use a one-way float valve to connect the boiling and start-up chambers, it is more convenient to use a valve that opens and closes based on commands from the controller 27. Referring to FIG. 5, upon shutdown the start-up valve 212 closes and the start-up chamber 204 is filled up to level controller 236. A one-way venting valve 252 prevents pressure build up during filling of the start-up chamber. When the controller 27 signals that additional distillate is needed, the condensate pump 228 drains the concentrate. The start-up valve 212 opens and the fresh feed enters the feed channels and boiling chambers. The distillate pump 234, blower/compressor 218, and heater 224 are then turned on and the distillation process begins.

The plate-in-frame heat exchanger is a simplified embodiment with relatively few boiler chambers 250 and condensing chambers 252. Of course, more chambers are possible. Also, other types of heat exchanger geometries besides the spiral heat exchanger 122 and the plate-in-frame heat exchanger 222 are also possible.

Vapor Compression Distillation Unit with Feed Water Sprayer

Figure 8:
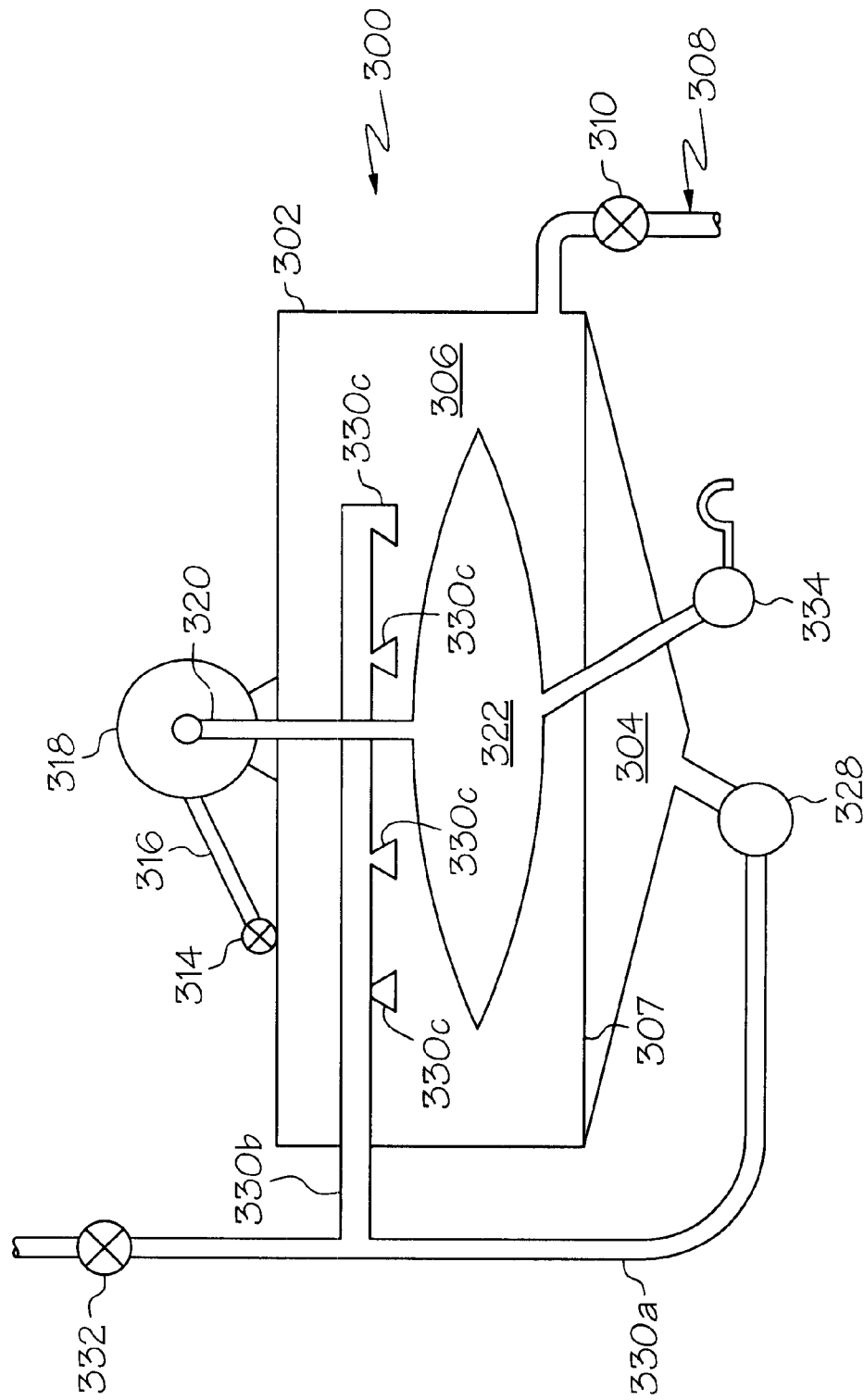
FIG. 8 is yet another embodiment of a vapor compression distillation unit suitable for use in the present invention.

Another embodiment of a vapor compression distillation unit 300, suitable for use in the present invention, is shown in FIG. 8. In vapor compression distillation unit 300, feed water is sprayed as droplets onto the exterior surface of a condensation cavity 322. The distilled steam then boils off of the droplets to yield distilled steam and, after condensation, liquid water. One potential advantage of this embodiment is the fact that the droplets of feed water have a large amount of surface area in proportion to their volume, so that evaporation of distilled steam is thereby facilitated.

More specifically, feed water is fed into the boiler chamber 306 of distillation tank 302 through feed valve 310 via feed pipe 308. The feed water then drops through a perforated floor 307 and down into concentrate recirculation section 304. Concentrate recirculation pump 328 pumps this feed water from concentrate recirculation section 304 into portion 330a of sprayer 330. During distillation, concentrate valve 332 is shut, so the water is forced from portion 330a into portion 330b and then out of the nozzles 330c. The nozzles 330c break the water pumped therethrough into a spray of fine droplets.

Nozzles 330c are located within boiler section 306 so that their spray is directed onto the exterior surface of condensation cavity 322. Heat from inside the condensation cavity 322 causes distilled steam to evaporate off of the droplets.

The distilled steam passes through one-way valve 314, through pipe 316 and into blower/compressor 318.

Concentrate left on the exterior surface of the condensation cavity 322 by evaporation of the distilled steam falls down onto the perforated floor 307 and then down into the concentrate recirculation section where it mixes with the feed water to be recirculated by concentrate recirculation pump 328.

The blower/compressor 318 increases the pressure and temperature of the distilled steam and drives the steam through pipe 320 into the interior of condensation chamber 322. Because the distilled steam has been pressurized by the blower/compressor 318, it will condense in the condensation chamber 322 at its elevated temperature. Because the condensing distillate has been brought to a relatively high temperature by the blower/compressor 318, the heat released by condensation will be transferred through the wall of the condensation chamber 322 to the droplets on its exterior surface, thereby evaporating distilled steam from the droplets. After condensation, hot distilled liquid water is pumped out of the distillation unit 300 by distillate pump 334 into a hot distilled water storage tank.

Adjacent Distillation Unit and Tank Embodiment

According to the present invention, the distillation unit is placed in thermal communication with a hot distilled water storage tank, so that the hot distilled water in the tank receives heat released by the distillation process. However, in some embodiments of the present invention, the distillation unit is located and constructed to be in thermal communication with the tank, without being located inside of the tank.

As an example of this, a combination distillation unit and hot distilled water storage tank 400 will be discussed with reference to FIG. 9. In this embodiment, the distillation unit 405 is located inside of a distillation chamber 406. The distillation camber 406 is adjacent to the tank 403 so that there is thermal communication between the distillation unit 405 and the tank 403. More specifically, tank 403 and distillation chamber 406, containing distillation unit 405, share a thermally conductive wall 450 which allows heat transfer between the chambers 403, 406. The thermally conductive wall 450 is made preferably of aluminum or some other highly thermally conductive material. The thermally conductive wall may have fins or other irregular geometry in order to enhance thermal conduction therethrough.

Preferably, distillation chamber 406 is dry so that motors on the various pumps, such as pump 410, of the distillation unit do not need to be waterproof. Alternatively, distillation chamber 406 may be filled with water to facilitate heat transfer from the distillation unit 405 to the thermally conductive wall 450 and tank 403. The exterior surfaces of tank 403 and distillation chamber are covered by a common layer of insulation 404, as shown in FIG. 9. This embodiment 400 may have certain advantages, such as easier access to the distillation unit 405.

The operations of apparatus 400 involved in distilling water and storing hot distilled water will now be discussed. Untreated, unheated feed water is carried by section 409a of feed pipe 409 to heat exchanger 423 (heat exchanger 423 will be further discussed below), where it may be preheated somewhat. Section 409b of feed pipe 409 then carries the feed water into the distillation chamber 406.

Coiled section 409c carries the feed water through the distillation chamber, through the wall 450 and into the hot distilled water storage tank 403. In coiled section 409c, heat is transferred from the distillation chamber 406 to the feed water, thus preheating the feed water in preparation for the distillation. The distillation chamber 406 will usually be at an elevated temperature during ongoing distillation due to thermal losses from the distillation unit 405. In this way, heat loss due to inefficiencies of the distillation unit 405 can be recovered, to an extent, by using the heat to preheat the feed water in coiled section 409c.

Section 409d of feed pipe 409 carries the feed water through the interior of the tank 403, back through wall 450 and into the distillation unit 405. Coiled section 409e, located within section 409d, allows heat transfer from the hot distilled water stored in the tank 403 to the feed water in feed pipe 409. In this way, heat lost from the distillation unit 405 to the distillation chamber 406, and then transferred through the thermally conductive wall 450 to the hot distilled water stored in the tank 403 is finally recovered by preheating water in the feed pipe 409 in preparation for distillation. Because of the preheating of the feed water on coiled sections 409c and 409e, the distillation unit 405 will need to add less heat to bring the feed water to the boiling point.

Distillation unit 405 may be constructed as any conventional distillation unit. Preferably, distillation unit 405 may be constructed as a vapor compression distillation unit for reasons discussed above. The distillation unit 405 is supported by struts 407 within the distillation chamber 406. The distillation unit 405 distills the feed water to yield distilled liquid water and concentrate. Distillate pump 410 pumps the distilled water through the distilled water exit 411 through wall 450 and directly into the hot distilled water storage tank 403.

When it is discharged from the distilled water exit 411, the distilled water will be close to the distillation temperature (e.g., 155° F.). As this water is mixed with the previously stored distilled water, it will cool to an appropriate residential hot water storage temperature (e.g., 120° F. to 150° F.). The heat from this newly discharged hot distilled water helps to preheat incoming feed water in coiled section 409e and also to compensate for thermal losses through the walls of the tank 403.

Concentrate exits the distillation unit 405 through the concentrate exit pipe 413. First, portion 413a of concentrate exit pipe 413 carries the concentrate from the distillation unit, through wall 450 and into the inside of tank 403. The concentrate will usually be discharged at a temperature close to the distillation temperature (e.g., 155° F.). Next, the concentrate travels through the coiled portion 413b of the concentrate exit 413. In the coiled section 413b, heat will be transferred from the hot concentrate to the hot distilled water stored in the tank 403. In this way, heat from the concentrate is usefully recovered by helping to maintain the hot distilled stored water at an appropriate storage temperature (e.g., 120° F. to 150° F.).

Figure 9:
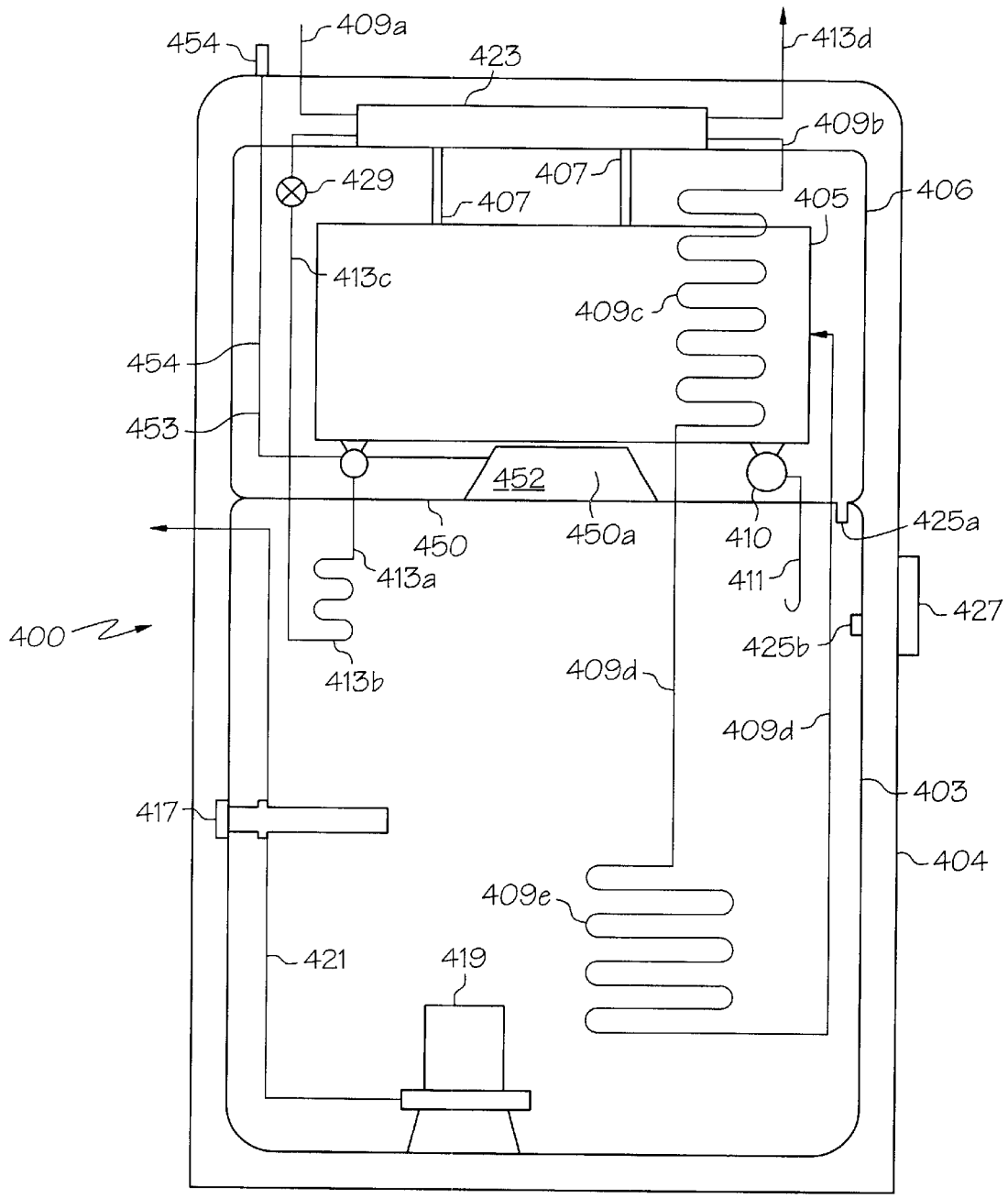
FIG. 9 another preferred embodiment of a combined distillation unit and distilled water heater according to the present invention.

Next, the portion 413c of concentrate exit pipe 413 carries the concentrate through wall 450, back into the distillation chamber 406, and into concentrate heat exchanger 423, which is embedded in thermal insulation layer 404, as shown in FIG. 9. Concentrate valve 429 is located in portion 413c of the concentrate exit pipe 413. The concentrate exit valve 429 is opened and closed to control the flow of concentrate out of the distillation unit 405.

In concentrate heat exchanger 423, heat is transferred from the concentrate in the concentrate exit pipe 413 to the incoming feed water in pipe 409. After passing through the heat exchanger 423, portion 413d carries the concentrate to an appropriate disposal location.

Hot distilled water storage tank 403 maintains a reservoir of hot distilled water to be used for hot or cold water needs.

Heating element and thermostat 417 is used to ensure that the temperature of the stored hot distilled water in tank 403 does not fall below an appropriate minimum temperature (e.g., 120° F.). Submersible pump 419 pumps the hot distilled water out of the tank 403 via hot distilled water supply pipe 421. The hot water then goes to a hot distilled water distribution system, or it may be cooled and supplied to a cold distilled water distribution system. In this way, apparatus 400 can supply hot and cold distilled water for only a small cost increase over the cost necessary to heat untreated water.

Upper and lower tank level sensors 425a and 425b detect the level of the stored distilled water in the tank, and operations controller 427 uses the detected level information to control operations, such as starting and stopping distillation. It is noted that the upper tank level sensor 425a is placed at the top of tank 403 in the vicinity of thermally conductive wall 450. This is because the tank 403 should preferably be filled up to the wall 450 so that there is a large surface area of hot distilled stored water in contact with the thermally conductive wall 450. This helps to promote heat transfer from the distillation chamber 406 through the wall 450 and into the hot distilled stored water.

Tank 403 is vented to the atmosphere through air shaft 453 and vent 454 so that atmospheric pressure can be maintained in the tank 403 despite fluctuating levels of stored water. Air channel 453 connects the vent 454 with a head space 452 defined by portion 450a of wall 450. This head space 452 provides an air space over the water in tank 403 even when the tank is filled so that the heated stored water is in contact with a large portion of wall 450. As previously stated, contact between the heated stored water and wall 450 facilitates heat transfer from the distillation chamber 406 to the stored distilled water. Apparatus 400 can be modified so that the distillation chamber 406 is below the tank 403 or on the side of tank 403.

As explained above, the foregoing embodiments are intended primarily for use in a residential setting. However, similar distillation and storage devices could also be used for commercial applications, such as distillation of alcohol, shipboard facilities and any other applications where heat from a distillation unit can be used. The present is especially preferable in applications which exhibit intermittent demand for distilled product.

Having shown and described the preferred embodiments of the present invention, further adaptions of the combination distillation unit and water heater apparatus described herein can be accomplished by appropriate modifications by one of ordinary skill in the art without departing from the scope of the present invention. A number of such alternatives and modifications have been described herein, and others will be apparent to those skilled in the art. Accordingly, the scope of the present invention should be considered in terms of the following claims, and is understood not to be limited to the details of the structures and embodiments shown and described in the specification and drawings.

I claim:

1. An apparatus for distilling and storing liquid, the apparatus comprising:
    a distillation unit adapted to receive a feed liquid and to distill the feed liquid to yield products of distillation including distilled liquid and concentrate and to release heat during distillation;
    a tank defining an interior space adapted to receive at least one product of distillation from the distillation unit and to store the received at least one product of distillation, with the distillation unit disposed within the tank so that the at least one product of distillation stored in the tank will be subjected to heat released from the distillation unit;
    a feed tube for delivering feed liquid to the distillation unit, said feed tube disposed at least partially within the interior of the storage tank and in thermal communication with the at least one product of distillation stored in the tank so that the feed liquid is preheated by the at least one product of distillation stored in said tank prior to the feed liquid being received by said distillation unit; and
    a heater for heating the at least one product of distillation stored in the tank.

2. The apparatus according to claim 1, wherein said interior space of the tank is adapted to receive and store the distilled liquid.

3. The apparatus according to claim 1, wherein the distillation unit is adapted to distill the feed liquid by vapor compression distillation so that heat released by condensation of the evaporated feed liquid provides some of the heat for evaporating the feed liquid.

4. The apparatus according to claim 1, wherein said interior space of the tank is adapted to receive and store the distilled liquid, and further comprising:
    a concentrate exit tube which carries concentrate out of the distillation unit, the concentrate exit tube being arranged in thermal communication with the feed tube so that heat can be transferred from the concentrate to the feed liquid.

5. The apparatus according to claim 4, further comprising:
    a heat exchanger which effects the transfer of heat between the concentrate in the concentrate exit tube and the feed liquid in the feed tube.

6. The apparatus of claim 4, wherein said concentrate exit tube is disposed at least partially within the interior of the storage tank and in thermal communication with the at least one product of distillation stored in the tank so that heat will be transferred from the concentrate to the stored distilled liquid.

7. The apparatus of claim 4, further comprising a heat exchanger wherein heat is transferred from the concentrate to the feed liquid.

8. The apparatus according to claim 1, wherein said interior space of the tank is adapted to receive and store the distilled liquid, further comprising:
    a concentrate exit tube which carries concentrate out of the distillation unit, the concentrate exit tube being arranged in thermal communication with the distilled liquid stored in the tank so that heat can be transferred from the concentrate to the stored distilled liquid.

9. The apparatus according to claim 1, further comprising at least one level sensor for detecting the amount of the at least one product of distillation stored in said tank, wherein said apparatus is configured such that said distillation unit is activated and deactivated in response to said level sensor in order to maintain the desired level of the at least one product of distillation in the tank.

10. The apparatus of claim 1, wherein said distillation unit comprises:
    a boiler chamber;
    a start-up chamber having a start-up chamber wall located between and separating the boiler chamber from the start-up chamber, wherein the start-up chamber wall has at least one hole defined therein to allow passage of liquid from the start-up chamber to the boiler chamber;
    a boiler heating element;

a blower or compressor;

a condenser being arranged in thermal communication with the feed liquid in the boiler chamber so that heat is transferred from a condensing steam in the condenser to the feed liquid in the boiler; and a distilled liquid exit.

11. The apparatus of claim 10, further comprising a cooler for cooling at least one product of distillation received from said storage tank.

12. An apparatus for distilling and storing liquid, the apparatus comprising:

a distillation unit which is adapted to receive a feed liquid and to distill the feed liquid to yield distilled liquid and concentrate and to release heat during the distillation, the distillation unit further comprising:

a boiler chamber;

a start-up chamber having a start-up chamber wall located between and separating the boiler chamber from the start-up chamber, wherein the start-up chamber wall has at least one hole defined therein to allow passage of liquid from the startup chamber to the boiler chamber;

a boiler heating element;

a blower or compressor;

a condenser being arranged in thermal communication with the feed liquid in the boiler chamber so that heat is transferred from a condensing steam in the condenser to the feed liquid in the boiler; and a distilled liquid exit; and a tank defining an interior space adapted to receive and store distilled liquid, with the distillation unit disposed within the tank so that the distilled liquid stored in the tank will be subjected to heat released from the distillation unit in use;

wherein the apparatus is configured such that the feed liquid is preheated by the distilled liquid stored in said tank prior to the feed liquid being received by said distillation unit.

13. The apparatus according to claim 12, further comprising a feed tube which carries the feed liquid to the distillation unit, with at least a portion of the feed tube being disposed within the interior space of the tank so that heat can be transferred from the distilled liquid stored in the tank to the feed liquid in the feed tube.

14. The apparatus according to claim 12, further comprising a concentrate exit tube, with at least a portion of the exit tube being disposed within the interior space of the tank so that heat can be transferred from the concentrate in the concentrate exit tube to the distilled water stored in the tank.

15. The apparatus according to claim 12, further comprising at least one-way valve arranged to allow the passage of liquid from the start-up chamber to the boiler chamber.

16. The apparatus according to claim 12, wherein said condenser comprises a heat exchanger.

17. The apparatus of claim 16 wherein the heat exchanger is a spiral heat exchanger.

18. The apparatus according to claim 16 wherein the heat exchanger is a plate-in-frame heat exchanger.

19. The apparatus according to claim 12, further comprising a heater adapted to heat said distilled liquid stored in said tank.

20. A method of distilling and storing liquid comprising the steps of:

providing an apparatus for distilling and storing liquid, the apparatus comprising a distillation unit, and a tank arranged to receive and store a product of distillation from the distillation unit, wherein said distillation unit is disposed within said tank;

supplying feed liquid to the distillation unit through a feed pipe which is disposed at least partially within the interior of the storage tank and is in thermal communication with the distillation product stored in the tank such that the feed liquid is preheated by the distillation product stored in said tank;

distilling the feed liquid in the distillation unit to yield a product of distillation so that heat released by the distillation unit during distillation is transferred to the product of distillation stored in the tank; and directing the product of distillation into the tank.

21. The method according to claim 20, further comprising the steps of:

heating, in the distillation unit, the feed water to evaporate steam from the feed liquid at a first pressure;

compressing the steam to a second pressure higher than the first pressure;

condensing the steam into distilled liquid at the second pressure so that it is in thermal communication with the feed water in the distillation unit; and directing the distilled liquid into the tank.

22. An apparatus for distilling and storing water, comprising:

(a) a distillation unit adapted to distill feed water to yield concentrate and distilled water;

(b) a storage tank adapted to receive distilled water from said distillation unit, to store said distilled water at a temperature elevated above room temperature, and to supply said distilled water on demand;

(c) a heater adapted to heat distilled water stored in said storage tank;

wherein said distillation unit is disposed within said storage tank such that said distilled water stored in said tank will receive heat from said distillation unit, wherein said heater is configured to maintain said distilled water at said elevated temperature when said distillation unit is shutdown, and wherein the apparatus is configured such that the feed water is preheated by the distilled water stored in said tank prior to the feed water being received by said distillation unit.

* * * * *

UNITED STATES PATENT AND TRADEMARK OFFICE
CERTIFICATE OF CORRECTION

PATENT NO.   : 6,402,897 B1
DATED        : June 11, 2002
INVENTOR(S)  : Charles L. Gunn It is certified that error appears in the above-identified patent and that said Letters Patent is hereby corrected as shown below:

<u>Column 21,</u>
Line 52, change "at least one-way valve" to -- at least one one-way valve --.

Signed and Sealed this

Twenty-second Day of October, 2002

Attest:

Attesting Officer

JAMES E. ROGAN
*Director of the United States Patent and Trademark Office*